Oct. 17, 1939.   R. C. MACHLER   2,176,087
STANDARD FOR OPTICAL PYROMETRY
Filed March 16, 1938
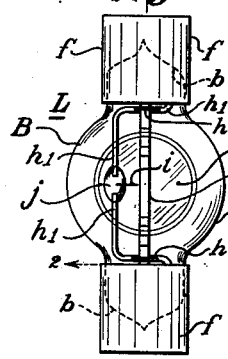
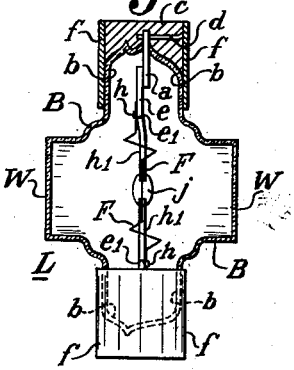
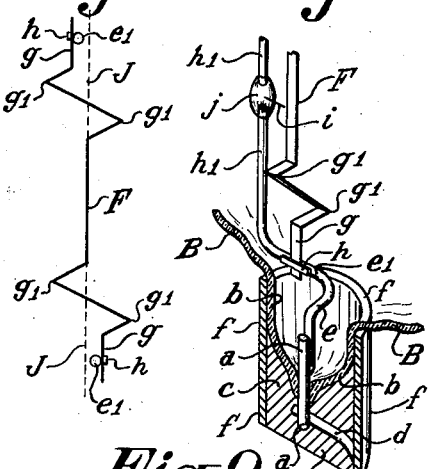
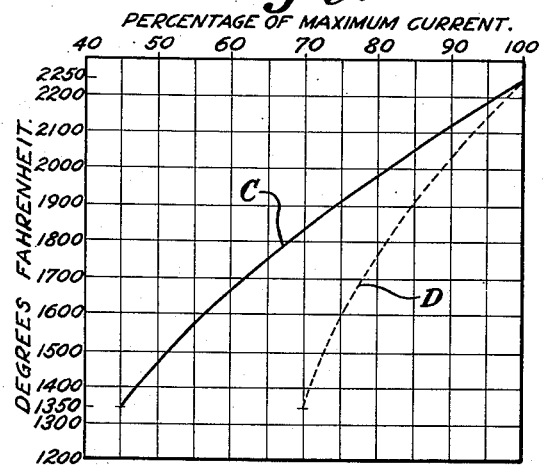
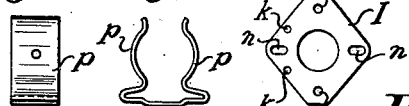
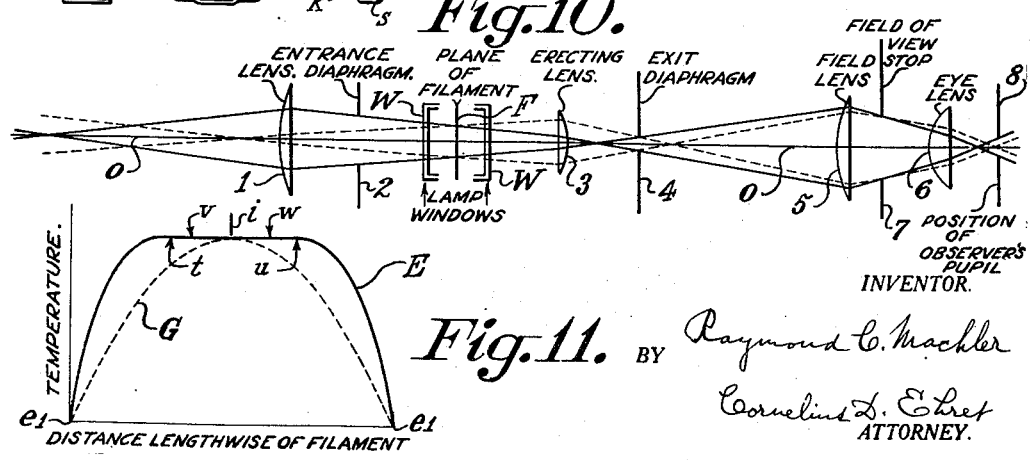
INVENTOR.
BY Raymond C. Machler
Cornelius D. Ehret
ATTORNEY.

Patented Oct. 17, 1939

2,176,087

UNITED STATES PATENT OFFICE 2,176,087

STANDARD FOR OPTICAL PYROMETRY

Raymond C. Machler, Philadelphia, Pa., assignor to Leeds & Northrup Company, Philadelphia, Pa., a corporation of Pennsylvania Application March 16, 1938, Serial No. 196,137

26 Claims. (Cl. 176—16)

My invention relates to optical-pyrometry, more particularly to a standard of brilliance having known temperature-current and brilliance-current characteristics; especially to an electric incandescent lamp serving as such standard and particularly suitable for a portable pyrometer, to the lamp structure and mounting, and more especially to the lamp filament, its structure, proportions, and characteristics.

My invention resides in and comprehends the hereinafter described structural features and aspects of an electric incandescent lamp for optical-pyrometry, its mounting, its filament, the structure, proportions and characteristics of the filament, and the mounting of the filament.

For an understanding of my invention and illustration of one of the forms it may take reference is had to the accompanying drawing, in which:

Fig. 1 is an elevational view of a lamp embodying my invention;

Fig. 2 is a cross-sectional view, partly in elevation, on the line 2—2 of Fig. 1;

Fig. 3 is a fragmentary edge-wise view illustrative of one form and mounting of a filament, in accordance with my invention;

Fig. 4 is a fragmentary view, in perspective, partly in section, of a lamp of the character illustrated in Figs. 1 and 2;

Fig. 5 is a plan view of the lamp and its terminals, and the adjustable mounting therefor;

Figs. 6 and 7 are respectively side and end elevational views of lamp-terminal receiving clips;

Fig. 8 is a plan view, on reduced scale, of a block of the lamp mounting of Fig. 5;

Fig. 9 comprises graphs illustrative of a characteristic of my improved filament;

Fig. 10 is a diagrammatic illustration of one of various forms of optical systems in which my lamp may be employed;

Fig. 11 comprises graphs illustrative of temperature gradients lengthwise of a filament.

It is an aspect of my invention that the filament F, electrically heated by passage of current therethrough to incandescence for matching its brilliance with that of an incandescent body under black or non-black body conditions, shall be wholly or at least for its portion in and adjacent the field of view, in the form of a ribbon, flat and preferably straight, thin compared to its width, very narrow compared to its length, very thin compared to its length, and of cross-section, rectangular or equivalent, whose width and thickness are very small compared to its aforesaid length.

It is disposed within the lamp L, comprising the highly evacuated glass bulb B, Figs. 1, 2, 4 and 5, having, at its opposite ends, stems $b$ coaxial with each other and with the filament. Upon the stems $b$ are mounted, and held by cement $c$ or equivalent material, the metal ferrules $f$, $f$, of cylindrical or other suitable form, constituting the external terminals of the lamp. Extending through and sealed to the ends of the bulb stems $b$ are members $a$, $a$, of tungsten or other suitable metal to which are welded or otherwise connected conductors $d$ connected to the ferrules $f$, $f$. To each member $a$ is welded or otherwise attached a wire or member $e$, of nickel or other suitable material, whose portion $e1$ extends transversely, Fig. 4. Each end $g$ of the filament is held or clamped to one of aforesaid portions $e1$, in electrical contact therewith, by a flat strip $h$, or equivalent member, which and the element $e1$ are attached to each other, as by welding or otherwise.

For centering or positioning the middle of the central zone of the filament F in the field of view, or for determining the position of the filament with respect to its mounting before final attachment thereto, there is provided the wire or other slender pointer $i$, whose one end is sealed in the bead $j$ of glass or other suitable insulating material, and whose free end closely approaches but does not touch the edge of the filament F. The index or pointer $i$ serves, as hereinafter described, to position the lamp as a whole and the central zone of its filament F with respect to the optical axis 0, Fig. 10. The bead $j$ is sealed on the offset extensions $h1$, $h1$ of the members $e$, $e$, Fig. 4.

The glass of which bulb B is composed preferably is of high optical quality, has a very low coefficient of thermal expansion, sufficiently tough and strong to withstand reasonable handling and abuse, and permits baking at high temperatures; it may be, and preferably is, Corning "Nonex" glass.

High vacuum within the lamp bulb B is of importance with flat filaments of small thickness and proportions herein contemplated to insure and afford stability in those characteristics of the filament upon which depend accuracy of temperature measurements. The vacuum is preferably as nearly perfect as possible, to reduce to a minimum the gas remaining within the bulb which by oxidation or other effect upon the filament causes proportionately large reduction in the already very small thickness of the filament; the extremely high vacuum so avoids or materially lessens changes in the temperature-current or brilliance-current characteristics of the filament, and lessens or avoids change in emissivity of the filament, all contributing to aforesaid stability in filament characteristics.

The vacuum within the bulb B is such as procurable, for example, by a mercury diffusion pump, and is preferably about $10^{-6}$ millimeter of mercury, or better. Such degree of vacuum is of a new high order for pyrometer lamps, from 100 to 1000 times the vacuum of pyrometer lamps heretofore used, particularly such as in the below appearing example of filaments of circular cross-section.

While the lamp is in process of evacuation, it is subjected to prolonged baking at high temperatures. Before sealing the bulb off from the vacuum pump the filament is flashed. When, for example, the tungsten filament is .002 inch wide and .0002 inch thick and one inch long, it is aged, after sealing the bulb B off from the vacuum pump, by passing through the filament, for say twenty minutes, a current of say 135 milliamperes, or about twice the maximum operating current utilized when measuring temperatures, with decrease of the cold resistance by about 5%.

At opposite sides of the bulb B there are sealed thereto the plane windows W, W of glass, preferably the same as or generally like that of which the bulb B is composed. Both the inner and outer surfaces of each window are ground and polished and constitute parallel planes, procuring undistorted view of filament and hot body or target. To the planes of windows W, W the direction of view or axis O of the optical system is normal. The filament F is so mounted within the bulb B that its flat side or plane is parallel to the planes of the windows W, W, this combination insuring a clear, distinct, undistorted field of view, free from "ghosts" or reflections of the filament in or near its plane.

The mounting for the lamp L comprises the plate or block I of insulating material, Figs. 5 and 8, which may be Bakelite or equivalent, provided with slots $n$ through which pass bolts or screws $o$, $o$ secured to or threaded into the wall $m$ of member M, comprised in the housing of the optical system, whereby the block I and the lamp carried thereby may be adjusted transversely of the optical axis, and then secured by bolts or screws $o$, $o$ in adjusted position, so definitely to locate the central zone of the filament F transversely with respect to the optical axis with the flat side or plane of the filament normal to that axis.

Resilient metal clips or terminals $p$, $p$, Figs. 6 and 7, for receiving and exerting pressure upon the lamp ferrules $f$, $f$, are secured, Fig. 5, upon the base or block I by screws $s$, $s$, which also secure metallic terminal ears $r$, $r$, to which are attached the conductors, which may be anchored by screws $k$, $k$, which connect the lamp in circuit with the source of filament heating current and, generally, with a rheostat for varying the magnitude of that current.

The lamp-terminal receiving clips $p$, $p$ generally conform to the ferrules $f$, $f$, which may be rotated within the clips to position such that the plane or flat side of the filament F will be normal to the optical axis O, Fig. 10, or to move the lamp and its filament longitudinally, vertically in Fig. 5, to bring the index or pointer $i$, and therefore the center of the central zone of the filament F, into position substantially corresponding with the optical axis O.

Accordingly filament F may be rotatably adjusted about its longitudinal axis, and adjusted longitudinally of its axis, and may also be adjusted transversely of its own axis, all adjustments having the effect of properly and precisely positioning the filament with respect to the optical axis.

As indicated in Figs. 1-4, the filament F adjacent its opposite ends may be and preferably is crimped transversely of its flat sides to form at or adjacent either or both ends one or more folds or tucks $g1$ which afford a greater filament length between terminals $e1$, $e1$; so impeding conduction of heat from its central zone to its mountings and the supports of the latter, and making possible a greater total length of filament, between its terminals for a given size of bulb B.

The aforesaid folds or tucks adjacent the ends of the filament also serve more yieldingly to mount the filament as a whole, and particularly the central or optically useful zone thereof, and thereby readily to absorb shocks to which the lamp mounting and appurtenances may be subjected, and under which the filament will the more readily yield in a direction normal to its plane or flat side and in consequence is protected against injury or distortion.

The filament supports or anchorages $e1$, $e1$, may be in line with the plane of the central portion or optically useful zone of the filament, or both spaced somewhat to one side of that plane, or, and preferably, as indicated in Fig. 3, on opposite sides of that plane J and spaced somewhat therefrom. In any event, by recourse to one or more folds or tucks at one or each end of the filament, it is rendered more or less completely immune to shocks, especially those effective normal to its plane or flat sides, because it readily yields or is readily distorted in the direction normal to its plane; and laterally, the filament is the more rigid because flat, insuring minimum or sustantially no filament vibration across or transversely of the optical axis O; and the tucks $g1$, being symmetrical with respect to the central zone of the filament and at opposite ends thereof, reduce rotational vibrations of the central zone about the optical axis and transverse vibrations of the central zone across the field of view.

The filament may consist of any suitable material, such as tantalum, platinum, molybdenum, carbon, or, and preferably, tungsten, all of which materials are characterized as highly refractory, and in consequence easily and quickly aged with assurance of stability.

When of metal, the filament may be produced by rolling a wire of the chosen metal into the form of a flat ribbon of width and thickness herein contemplated.

One of the advantages of a flat or ribbon-like filament is that it affords filament surface large in relation to the photometric field, is readily visible without excessive magnification though the area of its cross-section be very small as and for the herein described purposes.

A suitable thickness for the filament F is .0002 inch and may vary from about .002 to about .00002 inch; and, in general, the thinner the filament the better.

A suitable width for the flat side of the filament is .002 inch; and, in general, may be of a width lying between the limits of about .001 and about .01 inch. A suitable ratio of width to thickness is about 10, though it may vary widely therefrom for the various thickness and widths, above mentioned. In general, the ratio of width to thickness lacks significance if less than 3 to 1; and a ratio less than 3 to 1 is not preferred.

A suitable total length of filament between anchorages or terminals e¹, e¹, is one (1) inch, for which length a thickness of .0002 and width of .002 inch are suitable and afford the several and various improvements and advantages herein referred to or contemplated. However, the length may be much greater or smaller, and may range, for example, from one-quarter (.25) inch to about two (2) inches; and for the different lengths suitable concurrent widths and thicknesses lie within their aforesaid ranges.

In general, the smaller its area of cross-section (product of thickness and width) the smaller is the current necessary to heat the filament to highest temperature or brilliance necessary for the ranges of temperatures to be measured by the pyrometer of which it forms a part. A small cross-section and great length are preferred as involving, respectively, smaller current and power, thereby rendering sufficient or making possible the use of smaller source of heating current. For example, when the filament is about one inch in length, .002 inch width and .0002 inch thickness, the source of current may comprise four #950 Eveready flashlight cells in series, constituting a current source so light in weight as substantially to avoid excess in total weight of portable pyrometer apparatus, such for example as described in my co-pending application Serial No. 198,450 filed March 28, 1938, in which system and for the high and low range scales therein shown and described, the lamp and filament herein described, and the current source therefor, may be utilized.

For a given length of filament, the less its thickness the better; which is to say that the ratio of thickness of the flat filament to its length is small, and, in general, the smaller the better. For example, when the tungsten filament is .002 inch wide and .0002 inch thick, the current for heating it to maximum brilliance or filament temperature required, as for example the maximum temperature of 2250° F. of the low range scale of aforesaid co-pending application, is about 60 milliamperes, which is of the order of one-tenth of the filament currents heretofore commonly used in the case of tungsten filaments of circular cross-section, .003 inch in diameter, one inch long, and requiring a current between .3 and .5 ampere.

The ratio of thickness to length may range from about .002 to 1 to .00002 to 1, or ratio of length to thickness from about 500 and upwards. In general, the smaller the ratio of thickness to length the better, and from that ratio flow the advantages; (a) the freer is the filament from the effect upon its temperature or brilliance of variations in ambient temperature; the thinner the filament with respect to its length the less are the effects of variations of ambient temperature upon its current-temperature, or current-brilliance characteristic, with resultant less effect upon accuracy of the readings of temperature; (b) the time lag of the filament, the time required for it to come to stable temperature or brilliance, after inception of current flow through the filament, is materially reduced, with materially less drain upon the current source or battery and is far less than the time required for filaments of circular cross-section of aforesaid example heretofore commonly used to come to stable temperature; with the small ratios of thickness to length here contemplated stability in temperature or brilliance is reached in a few or two or three seconds, as compared to the aforesaid filaments of circular cross-section which do not reach stability until from about 1 to 3 minutes after inception of current flow therethrough; this reduction of time lag is important and significant where measurements of temperature must be made quickly, as in the case of incandescent sheets, ingots or the like in motion, as in a rolling mill; (c) the smaller the ratio of thickness to length the longer is that portion of the filament on either side of the center of its central zone, that is, on either side of the index i, which will be at uniform temperature or brilliance, or otherwise stated, the greater the assurance that the central zone of the filament appearing in the field of view is throughout at substantially uniform temperature or brilliance.

Where the relation of cross-section to length or ratio of thickness to the length of the flat filament is small, there arises the further advantage of material improvement in accuracy in reading temperatures with the pyrometer of which the filament is a part, in that for a given extent of change in temperature or brilliance of the filament the related change in current in percentage of maximum filament heating current for effecting such extent of change of its temperature or brilliance is greater than in the case of aforesaid filaments of prior practice of circular cross-section whose ratio of diameter of filament to length is materially greater than here contemplated. In consequence of the aforesaid greater change in percentage of maximum filament current with the present filament with the same or given accuracy in reading the magnitudes of the filament currents, the greater is the accuracy in temperature measurements by means of the pyrometer; or, conversely, the filament current need not be read with that degree of accuracy with the present filament to procure the same accuracy in temperature readings possible with aforesaid filaments heretofore commonly used. This is illustrated in Fig. 9 where abscissae are percentages of maximum filament current and ordinates are temperatures. With a filament of aforesaid example typical of prior art practice to which the characteristic D applies, for any given extent of temperature change, the concurrent extent of change in current in percentage of maximum filament current changes relatively less than in the case of the characteristic C relating to the present filament, where for the same extent of temperature change the change in percentage of maximum filament current is greater. In general, the characteristics or graphs C and D may be said to have different slopes; the slope of the curve C at any given temperature is less than the slope of the characteristic D at the same temperature.

In Fig. 10 is illustrated an optical system in which, or equivalent thereof, may be utilized a lamp of the character illustrated in Figs. 1-5, and particularly any lamp comprising a filament having the proportions and characteristics of my present invention. The example of optical system illustrated consists of a telescope, at suitable position axial whereof is positioned the lamp filament F, through which is viewed the black or non-black body, at suitable distance to the left, whose temperature is to be determined. The visible rays from the body whose temperature is to be measured or controlled enter through the objective lens 1 and thence through the entrance diaphragm 2 of suitable aperture; lens 1 brings an image of the body to focus in the filament plane F. To the right of the entrance diaphragm 2, between it and the erecting lens 3, is disposed the lamp with the plane of its filament indicated at F. To the right of the exit diaphragm 4 of suitable aperture is the field lens 5 between which and the eye-lens 6 is the diaphragm 7 having an aperture determining the magnitude of the field of view. The pupil of the observer's eye is located substantially at the plane 8. For example, the magnification of the filament by the lens system to the right thereof may be 10, the width of the filament then appearing many times greater than its true width, the filament being in focus concurrently with aforesaid image of the body under observation.

By rheostat, as in my aforesaid co-pending application, or by other suitable means, the magnitude of the current which directly (or indirectly as in my aforesaid co-pending application) heats the filament is varied to bring its brilliance to match that of the brilliance of the body whose temperature is to be measured, or where a body, by control of application of heat thereto is to be brought to a predetermined temperature, the filament heating current is set to correspond with the desired temperature, and the rate of application of heat to the body is varied until occurrence of match of brilliancies of the filament and the body whose temperature is varied.

By recourse to filaments of the proportions and characteristics herein described, and having particularly the characteristic that its central portion or zone, of length as viewed at least as great as the diameter of the field of view, is throughout of uniform temperature, the practically complete disappearance at brilliance match of the filament or its outline results throughout the field of vision; and because particularly of the smallness of ratio of thickness to length of filament, such complete disappearance of the flat filament, when its brilliancy and that of the body observed are the same, is obtainable with or at larger diaphragm openings, such as the apertures of the entrance diaphragm 2 and of the exit diaphragm 4, with consequent very much greater luminosity than in the case of filaments such as hereinbefore referred to of circular cross-section; in fact, in accordance with my invention, the luminosity may be as much as twenty-five or more times that in the case of the filaments of circular cross-section. So procuring much greater luminosity makes possible measurements of temperatures lower than possible with the old type filaments, such as the hereinbefore described filaments of circular cross-section, when the telescope has openings of diaphragms 2 and 4 small enough to effect perfect disappearance of the filament against the luminous field of the body under observation. Because of aforesaid larger diaphragm openings possible with the filament in accordance with my invention, and because of the resultant much greater luminosity, the brilliance matches throughout the range of temperatures to be measured are more accurate.

Fig. 11, in which ordinates are magnitudes of temperature and abscissae distances lengthwise of the filament between its terminals or anchorages $e1, e1$, is illustrative, graph E, respecting filaments of the lengths, thicknesses and cross-sections, and particularly of the ratios of thickness to length herein described, of their characteristically long portion or zone of uniform temperature, which temperature is the maximum filament temperature for any filament heating current corresponding with any of the temperatures to be measured, as for example from 1400° F. to 2250° F., or when absorption screen or structure is utilized, for a higher range or ranges from, for example, 2000° F. upwards. The flat top of the curve E is materially longer than the flat or curvilinear top of the characteristic curve G of filaments heretofore commonly used. The greater length of flat top of characteristic E is due to the great length of the filament with respect to its thickness or cross-section, under which circumstance its thermal resistance longitudinally is high, to such degree minimizing conduction of heat lengthwise toward and to either terminal or anchorage $e1, e1$, for all ambient temperatures encountered in practice, as to maintain the relatively long zone at substantially constant temperature and brilliance, and so insuring the entire portion of the filament within the field of view will, at match of brilliancies, uniformly and completely disappear against the image of the body under observation.

When the filament is one inch long between its aforesaid terminals or anchorages, and is .002 inch wide and of a thickness about one-tenth its width, the central portion of the filament which is at uniform temperature, as for example between the points $t, u$, has a length of about three-eighths of an inch at 1500 F. which is at least as long as, and preferably substantially longer, than the zone in the field of view, extending, for example, from the point $v$ to the point $w$ at approximately equal distances on the opposite sides of the point indicated by the index $i$, and which may be about three-sixteenths of an inch in length.

As indicated in Fig. 11, the portion $t$—$u$ of the filament, and especially the zone $v$—$w$ within the field of view, is central of the filament in the sense that the limits $t$ and $u$ are equi-distant, longitudinally of the filament, from their respective adjacent anchorages and appurtenances which are of or have equal heat capacities; and for any given magnitude of filament current the conduction of heat from the filament to the structure at its one end is equal to the conduction in the opposite direction to the structure at the other end. In consequence, the length $t$—$u$ of the filament does not shift in either direction lengthwise of the filament, and, particularly, by the expiration of the aforesaid extremely small time lag, the zone $t$—$u$ has attained fixed position or stability of position lengthwise of the filament. These effects are procurable by making the filament-supporting or mounting structure at one end thereof the same as that at the other end, and, as illustrated in Figs. 1, 2 and 4, yielding masses, thermally conductively connected with the filament, which have equal heat capacities. For example, referring to Fig. 4, the effective heat or thermal capacity of the group of elements for one end of the filament and consisting of anchorage $e1$, wire $e$, wire or lead $a$, connector $d$ and ferrule $f$ is the same as the heat or thermal capacity of the like group of elements for the other end of the filament. In brief, it is a characteristic of my lamp that the parts thereof in thermal conductive relation with the opposite ends of the filament have substantially equal heat capacities and may, for convenience, be structurally similar to each other.

The temperature coefficient of my filament, particularly that portion thereof at uniform temperature between aforesaid points $t$ and $u$, Fig. 11, and more especially of that portion of the central zone, between aforesaid points $v$ and $w$, within the field of view, is extremely small and in fact negligible due particularly to the relatively great length of the filament with respect to its thickness or cross-section. This temperature coefficient, which is a numerical expression for the change in temperature of the aforesaid significant central portion of the filament in degrees for each degree in change of the ambient temperature when that portion of the filament is at or about a predetermined temperature somewhere in the temperature range of the instrument in which the filament is utilized, for example 1400° F., is so small as to be incapable of determination by known measuring means or methods. It has been determined by calculation for the herein described tungsten filament one inch long, .002 inch wide and .0002 inch thick, to be about .03 degree Fahrenheit per degree Fahrenheit of change in ambient temperature, and is so shown to be negligible.

In any event the aforesaid temperature coefficient is small and negligible as compared with the temperature coefficient of aforesaid commonly used tungsten filament one inch long, and having a circular cross-section .003 inch in diameter, for which the temperature coefficient is about 1.3° F. change in temperature of the filament at that part thereof in the field of view for each degree F. in change of ambient temperature, when the filament was at, and when its heating current corresponded with, about 1400° F.

The temperature coefficient of my filament is related to its aforesaid very small time lag; when the time lag is extremely small, as it is in the present case, the temperature coefficient of the central portion of the filament is also extremely small and, in fact, negligible.

What I claim is:

1. An optical-pyrometric standard of brilliance comprising an electrically heated flat filament, and anchorages therefor between which said filament is of uniform cross-section throughout, the ratios of length of the filament between said anchorages to its width and thickness being so great that a large proportion of its length, including its observable portion, partakes of uniform temperature for each magnitude of heating current.

2. An optical-pyrometric standard of brilliance comprising an electrically heated flat filament, and anchorages therefor between which said filament is of uniform cross-section throughout, the ratios of length of the filament between said anchorages to its width and thickness being so great there is provided a relatively long observable portion of uniform temperature for each magnitude of heating current negligibly influenced by changes in ambient temperature.

3. An optical-pyrometric standard of brilliance comprising an electrically heated flat filament, and anchorages therefor between which said filament is of uniform cross-section throughout, the ratios of length of the filament between said anchorages to its width and thickness being so great that its observable portion for all temperatures to be measured has a temperature coefficient substantially negligible in magnitude.

4. An optical-pyrometric standard of brilliance comprising an electrically heated flat filament, the ratio of whose thickness to length is so small that decrease of its temperature from about 2250° F. to about 1350° F. corresponds with decrease of its heating current by more than thirty per cent of its heating current for 2250° F.

5. An optical-pyrometric standard of brilliance comprising an electrically heated flat filament whose cross-section and length are, respectively, so small and so great that its time lag is not greater than thirty seconds.

6. An optical-pyrometric standard of brilliance comprising an electrically heated flat filament, whose length and cross-section are such that its time lag is less than ten seconds.

7. An optical-pyrometric standard of brilliance comprising an electrically heated flat filament, the ratio of whose thickness to length is small, and anchorages therefor spaced longitudinally thereof on opposite sides of the central observable portion thereof, said filament crimped transversely of its flat side between its observable portion and said anchorages.

8. In an optical pyrometer, the combination with an optical pyrometer lamp comprising a bulb and a flat filament within said bulb disposed between opposite ends thereof, of a mounting for the bulb in which it is adjustable in sense to effect adjustment of the plane of the filament to position in which it is normal to an optical axis.

9. In an optical pyrometer, the combination with an optical pyrometer lamp comprising a bulb and a flat filament within said bulb disposed between opposite ends thereof, of a mounting for the bulb in which it is adjustable substantially parallel to the longitudinal extent of a central zone of the filament to position it with respect to an optical axis.

10. In an optical pyrometer, the combination with an optical pyrometer lamp comprising a bulb and a flat filament within said bulb disposed between opposite ends thereof, of a mounting for the bulb in which it is adjustable substantially parallel to the longitudinal extent of the filament and adjustable in sense to adjust the plane of the filament to position in which said plane is normal to an optical axis.

11. In an optical pyrometer, the combination with an optical pyrometer lamp comprising a bulb and a flat filament within said bulb disposed between opposite ends thereof, of a mounting for the bulb for adjusting it parallel to the plane of the filament transversely of an optical axis.

12. In an optical pyrometer, the combination with an optical pyrometer lamp comprising a bulb, terminals on opposite ends thereof, and a flat filament within said bulb disposed between said opposite ends thereof and connected to said terminals, of terminal members with which said terminals connect and in which said terminals are rotatably and longitudinally adjustable.

13. In an optical pyrometer, the combination with an optical pyrometer lamp comprising a bulb, terminals on opposite ends thereof, and a flat filament within said bulb disposed between said opposite ends and connected to said terminals, of terminal members with which said terminals connect and in which said terminals are rotatably and longitudinally adjustable, and a mounting for said terminal members adjustable in sense to effect adjustment of the observable portion of said filament transversely of an optical axis.

14. An optical pyrometer lamp comprising a bulb, a flat filament within said bulb, and flat windows in said bulb on opposite sides of said filament and parallel to the flat sides thereof.

15. An optical pyrometer lamp comprising a bulb, a filament therein, filament supports within said bulb, and an index member within said bulb, insulated from said supports and carried thereby in predetermined position with respect to said filament.

16. An optical pyrometer lamp comprising a bulb, a filament therein, filament supports within said bulb, and an index member within said bulb in predetermined position with respect to said filament, a member of insulating material on which said index member is carried, and means for supporting said member of insulating material on one of said filament supports.

17. An optical pyrometer lamp comprising a bulb, a filament within said bulb, filament supports within said bulb, members carried by said supports and extending toward and spaced from each other, a mass of insulating material into which the ends of said members extend, and an index member carried by said mass in predetermined position with respect to said filament.

18. An optical pyrometer lamp comprising a bulb, a filament within said bulb, filament supports within said bulb adjacent opposite ends thereof, members carried by said supports and extending toward and spaced from each other, a glass bead in which the ends of said members are embedded, and an index member embedded in said bead and disposed in predetermined position with respect to said filament.

19. An optical pyrometer lamp comprising a bulb, a flat filament therein, and an index member within said bulb insulated from said filament and supported in predetermined position longitudinally of said filament adjacent the edge thereof.

20. An optical pyrometer lamp comprising a bulb, and a filament therein whose observable portion is flat and of thickness within the range of from about 0.002 inch to about 0.00002 inch, said bulb evacuated to a pressure of the order of $10^{-6}$ millimeter of mercury.

21. An optical pyrometer lamp comprising a highly evacuated bulb, a filament therein, about one inch in length, and whose observable portion is flat, about .002 inch in width and about .0002 inch thick.

22. An optical pyrometric standard of brilliance consisting of a flat filament whose thickness is within the range of from about 0.002 inch to about 0.00002 inch, and whose width is not less than thrice aforesaid thickness and is within the range of from about 0.01 inch to about 0.001 inch.

23. An optical-pyrometric standard of brilliance consisting of a flat filament whose thickness is within the range of from about 0.002 inch to about 0.00002 inch, whose width is not less than thrice said thickness and is within the range of from about 0.01 inch to about 0.001 inch, and whose length is not less than about five hundred times said thickness.

24. An optical pyrometer lamp comprising a bulb having flat parallel windows, and a flat filament disposed within the bulb between said windows with the flat sides of its observable portion parallel to the planes of said windows.

25. An optical pyrometer lamp comprising a bulb having flat parallel windows intermediate its ends, a flat filament disposed within the bulb between said windows with the flat sides of its observable portion parallel to the planes of said windows, and terminals for said filament disposed respectively upon said ends of the bulb.

26. An optical pyrometer lamp comprising a bulb having at least one flat window, a filament within said bulb viewed through said window in comparing the brilliance of said filament with the brilliance of a body whose temperature is to be measured, and terminals for said filament disposed respectively on ends of the bulb on opposite sides of said window.

RAYMOND C. MACHLER.